Patented Apr. 21, 1931                                                          1,802,163

UNITED STATES PATENT OFFICE

KARL VIERLING, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF BUTYL ALCOHOL

No Drawing. Application filed December 3, 1928, Serial No. 323,588, and in Germany December 27, 1927.

The present invention relates to the manufacture of butyl alcohol.

In the fermentation of corn by means of bacteria belonging to the group of amylobacter bacteria, a product is obtained which consists of 84 per cent of n-butyl alcohol and 16 per cent of isopropyl alcohol. If, in this process, molasses is employed instead of the corn, very irregular and, in many cases, very bad yields of the said fermentation products are obtained.

I have now found that butyl alcohol can be obtained by a fermentation of molasses by means of bacteria belonging to the group of amylobacter bacteria in a very advantageous manner by adding to the mash containing molasses, which latter preferably have been subjected to a previous inversion, phosphates and solid and practically water-insoluble substances of natural origin containing protein. The said substances are for example pressed or dried yeast, malt germs, wastes in the manufacture of preserved meat, or the like. By working in this manner very high and always uniform yields can be obtained and a particular advantage of the present process consists in a considerable restriction of the time required for the fermentation.

The following example will further illustrate the nature of the said invention, but the invention is not restricted thereto.

Example 200 kilograms of crude molasses containing about 50 per cent of sugars are dispersed in 2.5 cubic meters of water, mixed with 10 kilograms of concentrated sulfuric acid and boiled for half an hour, whereupon 2.5 to 3 kilograms of solid malt germs are added to the mixture, the hydrogen-ion concentration of which is then reduced to a value of pH=6 to 7 by means of an addition of slaked lime. 0.5 kilogram of diammonium phosphate is then added, whereupon the mash is sterilized, cooled to 35° to 38° centigrade and inoculated with a highly active culture of a bacterium of the group of amylobacter bacteria. After a fermentation of 48 hours while excluding air, 40 kilograms of an oily product are obtained containing 75 per cent of butyl alcohol, about 16 per cent isopropyl alcohol and traces of acetone, but which product, in many cases, is completely free from acetone. The bacterium employed was obtained from garden soil by repeated selective growing on a peptone, agar and grape sugar medium and is stained in the Gram test. It shows mobile cells in the form of rods of from 4 to 5 x 1.5 microns size, the oval sporangia being usually attached near, or at, the end of the rods and being sometimes of a size greater than that of the rods.

What I claim is:—

1. A process for effecting fermentation with bacteria of the amylobacter group which comprises fermenting a mash comprising molasses, a phosphate and an addition of a solid and practically water-insoluble substance of natural origin containing protein.

2. A process for effecting fermentation with bacteria of the amylobacter group which comprises fermenting a mash comprising molasses, a phosphate and an addition of malt germs.

3. As a composition of matter a mash comprising molasses, a phosphate and an addition of a solid and practically water-insoluble substance of natural origin containing protein.

In testimony whereof I have hereunto set my hand.

KARL VIERLING.